United States Patent [19]

Sherwood

[11] 3,993,000

[45] Nov. 23, 1976

[54] FREIGHT PUSHING DEVICE

[76] Inventor: Clyde L. Sherwood, 1021 12th St., Santa Monica, Calif. 90403

[22] Filed: Dec. 26, 1974

[21] Appl. No.: 536,483

Related U.S. Application Data

[60] Division of Ser. No. 414,318, Nov. 9, 1973, Pat. No. 3,872,963, which is a continuation-in-part of Ser. No. 297,349, Oct. 13, 1972, abandoned.

[52] U.S. Cl.............................. 104/176; 104/162; 104/172 B; 198/732
[51] Int. Cl.²........................................ B61J 3/06
[58] Field of Search............... 104/134, 135, 147 R, 104/162, 165, 172 R, 172 B, 172 BJ, 176; 254/35, 38; 214/516; 198/170

[56] References Cited
UNITED STATES PATENTS

| | | | |
|---|---|---|---|
| 1,716,664 | 7/1929 | Prince | 104/172 B X |
| 2,639,888 | 5/1953 | Kilness | 254/35 |
| 2,990,941 | 7/1961 | Peras | 198/170 |
| 3,410,225 | 11/1968 | Saunders, Jr. | 104/172 B |
| 3,556,011 | 1/1971 | Saxonmeyer | 104/176 X |

FOREIGN PATENTS OR APPLICATIONS

| | | | |
|---|---|---|---|
| 2,033,268 | 1/1972 | Germany | 104/162 |
| 1,074,068 | 1/1960 | Germany | 104/165 |

*Primary Examiner*—L. J. Paperner
*Assistant Examiner*—Randolph A. Reese
*Attorney, Agent, or Firm*—Robert B. Hughes

[57] ABSTRACT

A freight handling system particularly adapted to transfer palletized loads from one side of a freight dock to another. There is an endless closed loop conveyor comprising an endless chain defining a closed loop path, along which are unidirectional rollers. At spaced locations along the conveying path, there are a number of transfer stations each having a plurality of multidirectional rollers, in the form of casters, which permit pallet loads to be moved onto and from the conveying path. A plurality of pushing devices, particularly adapted for use in the present invention, are mounted to the chain at regularly spaced locations. Each pushing device comprises a push arm which in its operative position has an upwardly and rearwardly moderately sloped push surface which engages a palletized load at a transfer station to move it along the conveying path over the rollers. Each push arm is provided with a releasable holding means which upon release permits the pushing device to pass beneath its load at a selected transfer station, after which the pushing device returns automatically to its operative position.

6 Claims, 12 Drawing Figures

FREIGHT PUSHING DEVICE

CROSS REFERENCE TO RELATED APPLICATIONS

This is a divisional application of my pending U.S. patent application, entitled "Freight Handling System", Ser. No. 414,318, filed Nov. 9, 1973 now U.S. Pat. No. 3,872,963, which is a continuation-in-part of my U.S. patent application, entitled "Sherwood-M Materials Handling Conveyor Assembly", Ser. No. 297,349, filed Oct. 13, 1972, now abandoned.

BACKGROUND OF THE INVENTION

1. Field of the Invention

The present invention relates to a freight pushing device especially adapted for use in a system for handling freight, as in a closed loop conveying system where palletized loads can be moved from one side of a freight dock to another.

2. Description of the Prior Art

There is in the prior art conveying devices used in the "merry-go-round" system which is found in use in present day freight docks, particularly in quite large freight docks. In such a system, there is a conveying chain which travels at or below the dock platform in an endless closed loop path between the loading and unloading sides of the dock, to move a plurality of wheeled carts in a closed loop. Each cart is provided with a "dog pin" which is engaged by one of a number of chain "dogs" positioned at regularly spaced intervals along the chain. As carts are loaded with freight and hooked onto the chain, they are carried to the other side of the dock, where the cart is released from the conveyor chain and unloaded. Subsequent to the unloading, the cart is again hooked onto the chain and carried back to the other side of the dock to be again loaded with freight.

One disadvantage of the conventional "merry-go-round" system described above is that its capacity is limited by the number of carts which it can carry at any one time. Since the empty carts must be returned to the opposite side of the dock, of necessity half of the conveying space along the endless chain is occupied by empties being returned to the loading side of the dock. Further, there is the problem that such carts when not in use can take up valuable space in the freight dock and otherwise impede operations. Another disadvantage of the system is that there is the initial expense of providing the wheeled carts adaptable to be carried along by the conveying chain, as well as the maintenance of the same.

Aside from the above described existing freight handling system and the pushing units associated therewith, there are in the prior art a variety of conveying devices and systems adapted for use in different types of operations. Typical of these are those shown in the following patents: Martin et al, U.S. Pat. No. 1,593,501; Shepherd, U.S. Pat. No. 1,856,733; Neal, U.S. Pat. No. 2,669,342; Timmons et al., U.S. Pat. No. 2,759,585; Peras, U.S. Pat. No. 2,990,941; Chasar, U.S. Pat. No. 3,182,823; Reighart, U.S. Pat. No. 3,269,501; McChain et al., U.S. Pat. No. 3,275,118; McCartney, U.S. Pat. No. 3,279,631; Lord, U.S. Pat. No. 3,333,675; Frey, U.S. Pat. No. 3,421,641; and Egeland et al., U.S. Pat. No. 3,447,665.

SUMMARY OF THE INVENTION

The present invention is a freight pushing unit particulary adapted for use in a freight handling system to transfer units of freight, such as palletized freight loads, from a first side of a freight handling platform, such as an unloading section of a dock, to a second side of the platform, such as a loading side of the dock. The system comprises a chain conveyor means located at the platform and arranged to travel a closed loop freight conveying path between the first and second sides of the platform. Roller means are positioned along the freight conveying path to provide a low friction freight conveying surface aligned with the freight conveying path. At spaced intervals along the conveying path, there are a plurality of transfer stations, each of which comprises multidirectional roller means which collectively provide a transfer surface to permit the load to proceed along the conveying path, or be pushed laterally from the path at the transfer station. Between the transfer stations, there are roller means which are desirably linearly oriented to provide a low friction conveying surface along the direction of the conveying path.

The pusher units of the present invention are mounted at regularly spaced intervals to the conveying chain. Each pusher unit comprises a push arm providing a pushing surface, which has a moderate upward and rearward slope, which provides for a less abrupt engagement of a palletized cargo load. Each pusher unit also has a releasable arm holding means which in its hold position securely holds the arm in its raised operating position to engage a freight load, and in a release position permits the arm to be pushed down to its disengaged position. Arm positioning means urges the arm means back to its raised cargo engaging position with a moderate force.

In operation, a cargo load, such as a palletized cargo load, is moved (for example from a truck being unloaded) along a transfer conveyor onto a transfer station of the main conveyor, where one of the pushing units engages the cargo to move it along the conveying path. When the cargo reaches a selected transfer station for unloading, the releasable arm holding means is moved to its release position to permit the push arm to be forced down to its release position by the force exerted by the resistance of the load to being moved along the conveying path, with the cargo thus remaining at the transfer station and the pusher unit passing underneath the cargo. After the pusher unit passes under the cargo, the arm positioning means, exerting a moderate force on the push arm returns the push arm to its engaged position to engage a subsequent load. The cargo can then be moved laterally from the transfer station along a transfer conveying means to be unloaded.

DESCRIPTION OF THE PREFERRED EMBODIMENT

Figure 1:
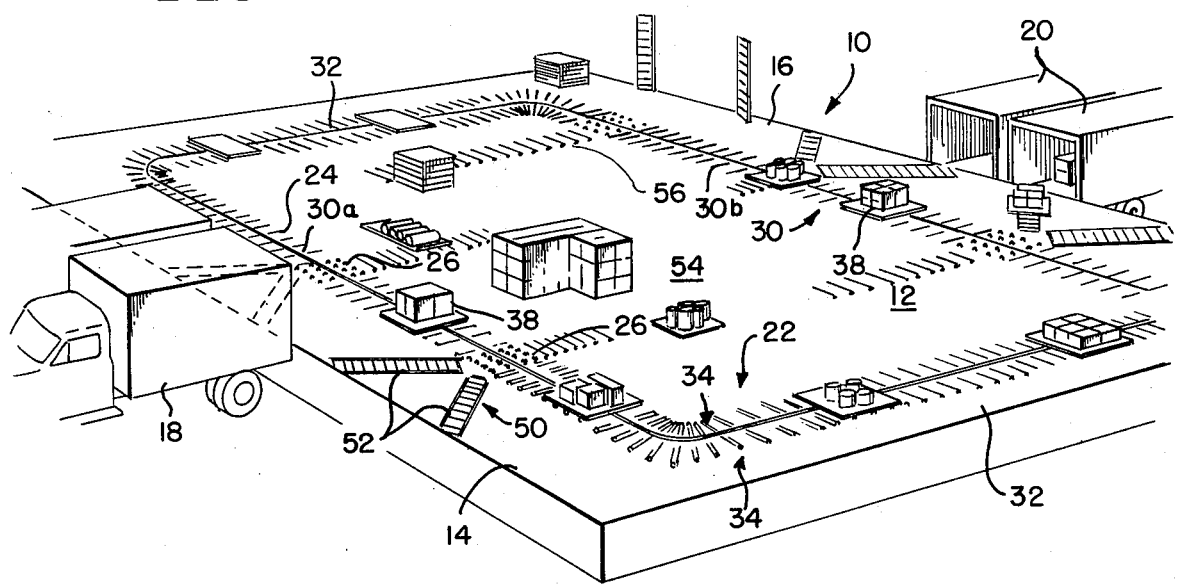
FIG. 1 is a perspective view of a freight dock employing a freight handling system for which the present invention is especially adapted.
Figure 2:
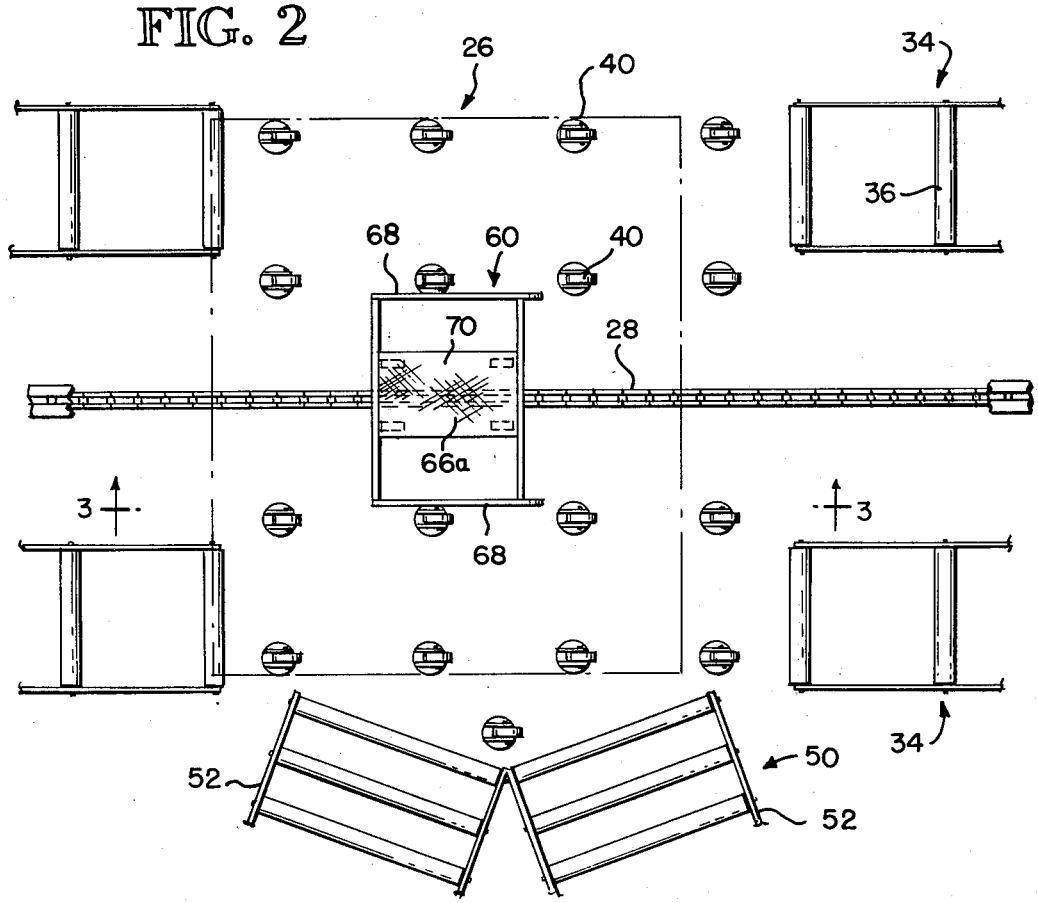
FIG. 2 is a top plan view of a transfer station of the system shown in FIG. 1.

In FIG. 1, there is shown a freight dock 10 having a working platform 12, with one side of the dock being an unloading section 14, and the other side being a loading section 16. Inbound freight is unloaded (as from semi-trailers or trucks, such as at 18), sorted out, moved to the other side of the freight dock 10 and reloaded onto other semi-trailers or trucks 20 to be carried to the proper destination.

The present invention is especially adapted for use in a particular system by which the freight is moved from one side of the dock 10 to the other. Before describing the pusher unit of the present invention, this system will be described in detail. The system comprises a closed loop conveyor system generally designated 22, comprising a plurality of linear conveying sections 24 with a number of transfer stations 26 at spaced locations along the conveyor 22 proximate the loading and unloading sections 14 and 16.

The conveyor 22 comprises an endless conveyor chain 28 positioned at or moderately below the top surface of the platform 12. This chain 28 forms a closed loop which can be considered as having four portions, namely two side portions 30a and 30b located proximate to, respectively, the unloading section 14 and the loading section 16, and two end portions 32 interconnecting the side portions 30a and 30b. This chain 28 is or may be similar to those already known in the prior art. Further, if a conventional "merry-go-round" system is already present in an existing freight dock, the endless chain of that "merry-go-round" system can be adapted for use in the present system. As a modification, it is possible to use a pair of laterally spaced conveying chains. Also, while the chain 28 provides an endless conveying path, the chain can be arranged in a number of sections arranged in line, with means, such as a sloped transition portion to move the cargo between conveying chain sections.

Each linear conveying section 24 comprises two roller sets 34, laterally spaced from one another and located on opposite sides of the conveying chain 28. Each of these roller sets 34 comprises a plurality of individual roller elements 36, each of which is mounted about a respective horizontal transverse axis with the top conveying surface of the roller 36 moderately above the level of the platform 12. The function of these sets of rollers 36 is to provide a low friction conveying surface which is linearly oriented for low friction movement along a conveying path paralleling the path of the chain 28. The spacing of the roller elements 36 of the roller sets 34 is such as to properly support a conventional palletized cargo load, such as shown at 38, comprising board 38a and the cargo 38b.

Figure 3:
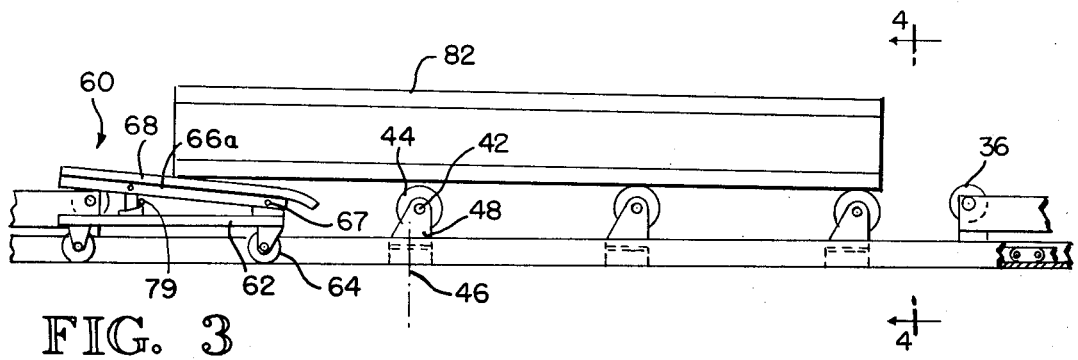
FIG. 3 is a sectional view taken along line 3—3 of FIG. 2.

Each transfer station 26 comprises a plurality of multidirectional rollers or wheels 40 arranged with their conveying surfaces in a horizontal plane substantially coplanar with the conveying plane of the roller sets 34. In the preferred form, these multidirectional rollers 40 are caster type roller units, as shown in FIG. 3. The axis of rotation 42 of the roller element 44 itself is spaced laterally from a related vertical axis 46 about which the roller mounting bracket 48 is swivel mounted. Thus, when the wheel elements 44 are parallel with the axis of rotation of the linear conveying rollers 36 so as to be oriented with the conveying path of the chain 28, there is a moderate resistance to swiveling of the roller elements 40 to a direction angled with respect to the conveying path. Therefore, if there is no lateral pushing force exerted against a palletized cargo load 38, the tendency is for the palletized load 38 to proceed through the transfer station and over the roller elements 40 and continue along the conveying path. However, as will be described more fully hereinafter, when a palletized cargo load 38 is released at a transfer station 26, by applying a lateral pushing force against the palletized cargo 38, the caster rolling elements 40 are caused to turn to permit the cargo unit 38 to be moved laterally off the conveying path of the conveyor 22.

Extending laterally and outwardly from each transfer station 26 is a transfer conveying means 50, which in the present embodiment is shown as two sets of rollers 52. These two roller sets 52 diverge from their related transfer station 26, each extending to a related truck loading or unloading station. Thus, in the present embodiment, one transfer station 26 can serve two trucks which are being loaded or unloaded.

That portion of the platform 12 which is enclosed by the conveyor 22 is designated 54, and is used as a temporary storage area for cargo. Desirably this temporary storage area 54 is provided with a plurality of roller units 56 which are desirably all multidirectional units, or a combination of unidirectional and multidirectional roller units so as to permit effective movement of palletized cargo in the temporary storage area 54.

Attention is now directed to FIGS. 2 through 5, which illustrate a first embodiment of the freight pushing unit of the present invention. Each such unit 60 comprises a base frame 62 mounted on a set of four wheels 64 and secured by a member 65 to the aforementioned conveying chain 28. The unit 60 further comprises a pusher arm 66 pivotally mounted at its forward end at 67 to the base frame 62. In the present embodiment, this pusher arm 66 comprises a lower mounting arm portion 66a, two laterally spaced arm elements 68 and a middle arm element 70, the arm elements 68 and 70 arranged to engage a palletized load 38 at laterally spaced locations for proper pushing engagement. The centrally disposed arm element 70 is rigidly interconnected to the two side arms 68 through suitable cross braces, and attached directly to the mounting arm 66a.

Figure 4:
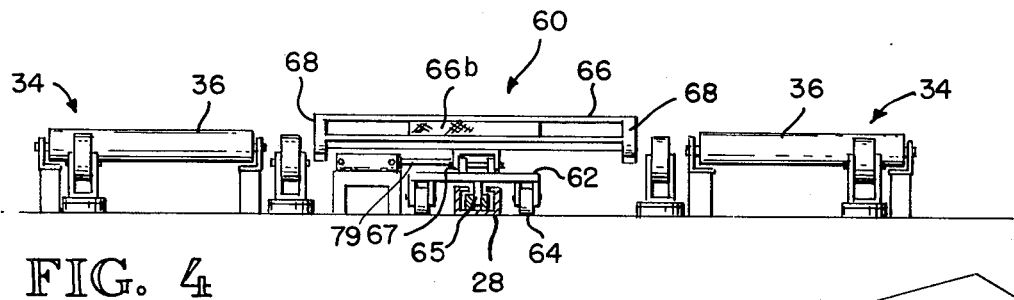
FIG. 4 is a sectional view taken along line 4—4 of FIG. 3.
Figure 5:
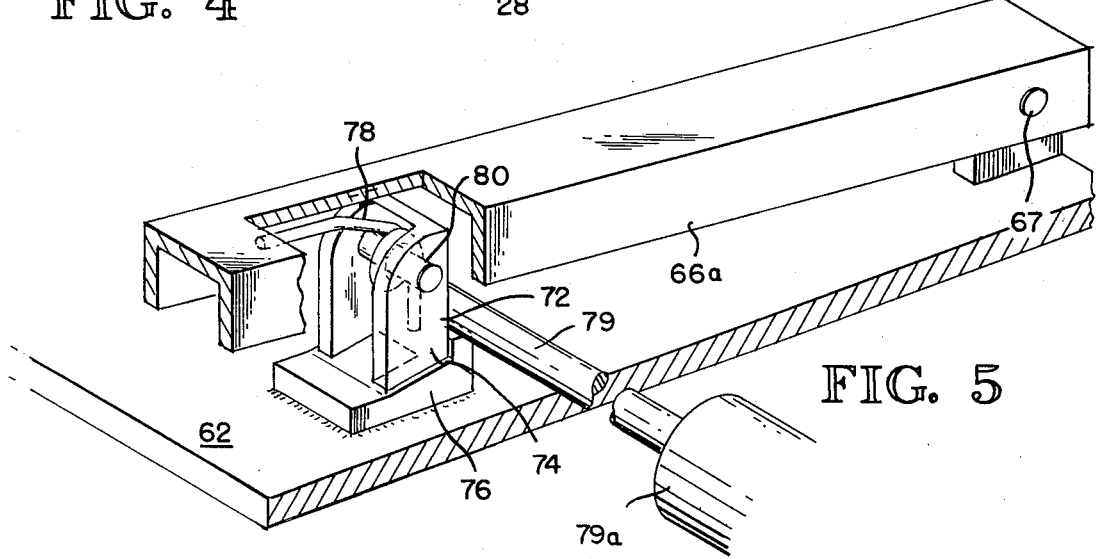
FIG. 5 is a perspective view of a portion of a first embodiment of the freight pushing unit of the present invention.

The upper surface of the arm member 66 (specifically the upper surface of the lateral arm member 68 and middle arm member 70) provide a moderately inclined push surface 66b by which a palletized load 38 can be moved along the conveyor 22. The arm member 66 has a raised operating position (as shown in FIGS. 3–5) where it is inclined at a moderate angle upwardly and rearwardly, with the forward portion of the push surface 66b of the arm member 66 being positioned below the planes of the rollers 36 and 40, and with the middle and rear portions of the upper push surface 66b of the arm 66 reaching above the plane of the rollers 36 and 40. The arm 66 has a second release position, in which it is pivoted downwardly to a location just below the conveying planes of the rollers 36 and 40.

Pivotally mounted to the lower mounting arm portion 66a and extending downwardly therefrom is a releasable arm holding means 72 which has a lower foot portion 74 having a flat lower surface which engages a matching seating element 76. This holding member 74 when engaging the seat 76, supports the arm means 66 in its raised engaging position, as shown in FIGS. 3 through 5.

A spring member 78 is coiled about a pin 80 about which the holding member 72 is pivotally mounted to the arm element 70. This spring member 78 bears against the arm portion 66a and the holding member 72 so as to urge the holding member 72 downwardly into its hold position where it bears against the seat 76. Once positioned in its seat 76, the foot 74, of the holding member 72 has the contact plane of its foot portion extending moderately forwardly and rearwardly of the transverse plane of the pivot pin 80, so that when a vertical load is placed on the arm 66, the hold member 72 is actually held in its downward hold position, as shown in FIG. 5.

To move the holding member 72 to its release position, the forward lower end of the holding member 72 is engaged to push it off its seat 76. This can be done, for example, by means of a laterally extending finger 79, mechanically mounted from an actuating cylinder 79a at a location proximate to the chain 28 at a related transfer station 26. The finger 79 can be moved by a suitable actuating linkage (not shown) from location to one side of the conveyor 22 into a position engaging the hold member 72. This permits a downward force on the arm member 66 to move the arm member 66 downwardly to cause the hold member 72 to pivot rearwardly into the middle arm portion 66a, against the urging of the spring 78. Upon release of the downward force on the arm 66, the spring member 78 exerts a moderate force that is sufficient to move the hold member 72 downwardly and forwardly to raise the arm member 66 and cause the hold member 72 to return to its hold position, where it rests in its seat 76.

The mode of operation of the present invention is now described as installed in a present day freight terminal where freight is unloaded from one side of a dock, sorted out, moved to the other side of the dock and reloaded onto motorized trucks or some other transportation device. As indicated previously, the system in which the present invention is desirably used is particularly adapted for use of conventional pallets to carry the freight. These pallets can be in the form of simply a flat sheet of plywood (e.g. one-quarter to one-half inch thick, and 40 inches by 48 inches in its lateral dimensions), or the pallet can be made in the form of upper and lower horizontal board members interconnected by several cross members, so that such pallets could also be manipulated by a conventional forklift.

Figure 6:
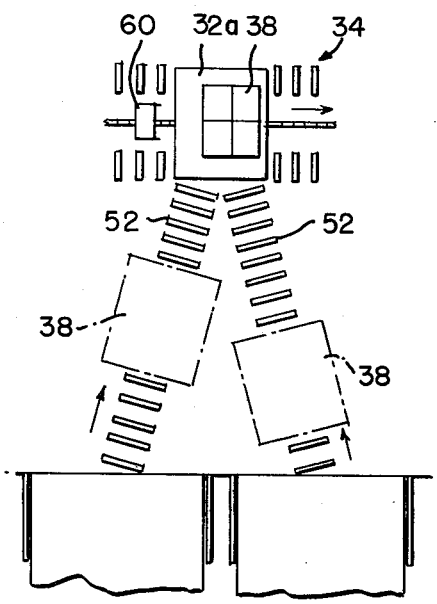
FIG. 6 is a top plan view illustrating a first step in the freight handling system where palletized cargo is moved onto the conveyor at a transfer station.
Figure 7:
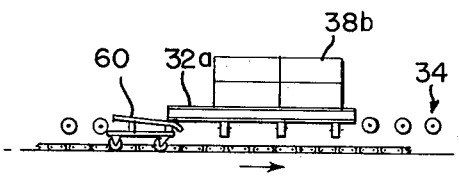
FIG. 7 through FIG. 10 are a sequence of side elevational views illustrating the manner in which a pusher unit is shown in schematic form pushing a palletized load along a conveying path and releasing it at a transfer station.
Figure 8:
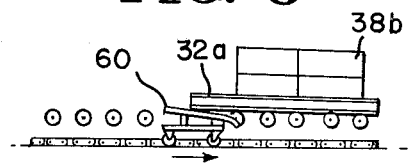

As illustrated generally in FIG. 1, the freight is unloaded, as from one or more trucks 18 at related unloading stations, with the freight being placed on pallet board 38a. The empty pallet board 38a is initially placed on one of the transfer conveyors 52 and then loaded with cargo 38b. Upon the completion of loading, the palletized load 38 is pushed along its transfer conveyor 52 onto the rollers 40 at its related transfer station 26, as illustrated in FIG. 6. The chain 28 is continuously traveling in its closed loop path, with its pushers 60 normally being in their raised freight engaging position. As a pusher 60 comes into engagement with the pallet 38a, the pallet 38a with its load 38b is pushed from its transfer station 26 along the path of the conveyor 22, (as shown in FIG. 7). Because of the moderate angle of the push surface 66b (e.g. between 5° to 10°) there is some tendency for the palletized load 38 to "ride up" onto the inclinded push surface 66b. As the palletized load 38 comes into sliding engagement with the push surface 66b there is a frictional force exerted on the palletized load 38 causing it to accelerate at a relatively gradual rate in the direction of travel of the chain 28 until the palletized load 38 is traveling along the conveying path at the same rate of speed as the chain 28. This arrangement alleviates any abrupt application of force in overcoming the inertial forces of the cargo load 38.

Figure 9:
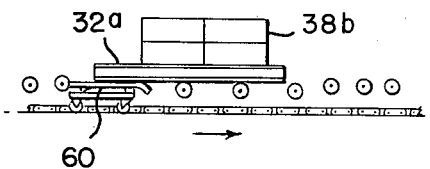
Figure 10:
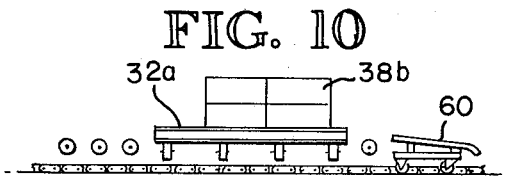

The palletized cargo load 38 continues on its path of travel along the end portion 32 of the conveyor 22 and then along the conveyor section 30b. At an appropriate location along the unloading section 16 of the work platform 12, the palletized load 38 is stopped at a transfer station so that it can be moved off the conveyor 22 and onto one of the transfer conveyors 52 to be unloaded, as onto a motorized truck 20. This is accomplished by moving the hold member 72 to its release position (as by engagement by a related finger 79). Since there is a frictional force exerted by the rollers 36 and 40 on the palletized freight load 38, this force pushes the arm 66 downwardly against the urging of the spring 78 acting on the released hold member 72, to permit the pushing unit 60 to pass beneath the cargo load 38, as illustrated in FIG. 9. After the pushing unit 60 has completed its passage underneath the load 38, the force of the spring 78 is sufficient to cause holding member 72 to swing downwardly and forwardly to raise the arm 66 back up to its push position, with the member 72 then becoming positioned in its seat 76 to hold the arm 66 securely in its hold position, as shown in FIG. 10. Thus, the arm 66 automatically returns to its push position.

Figure 11:
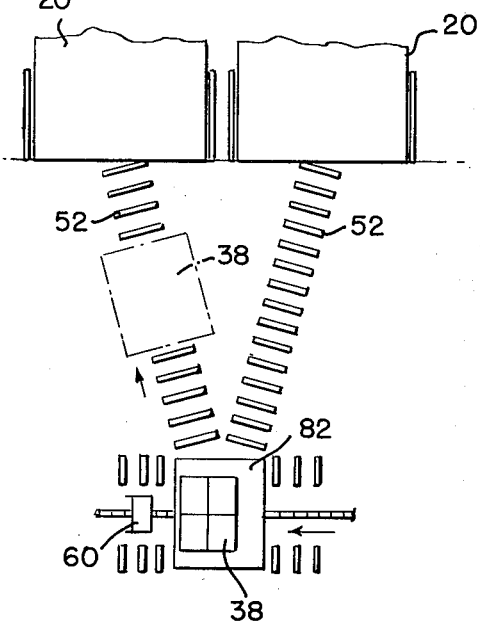
FIG. 11 is a view similar to FIG. 6, illustrating the manner in which the palletized cargo is moved from a transfer station to a truck after completion of the sequence shown in FIGS. 7 through 10.

With the palletized freight load 38 released from its pushing unit 60, the load 38 can then be pushed laterally along the multidirectional rollers 40 at the transfer station 26 onto one of the two transfer conveyors 52 to be moved to a respective truck 20, as shown in FIG. 11. When a number of palletized loads 38 have been unloaded, the empty pallets 38a, having a low vertical dimension, can be conveniently stacked in a pile. After an accumulation of the pallets 38a in a stack, this stack can be moved onto a transfer conveyor 52 and pushed back onto the path of the conveyor 22, where the stack of pallets 38a are moved back to loading side 14 of the dock, to be reused for loading. Thus, it can be appreciated that a relatively small percentage of the space on the conveyor 22 is used by empties (i.e. empty pallets) being returned to the loading section of the dock.

Figure 12:
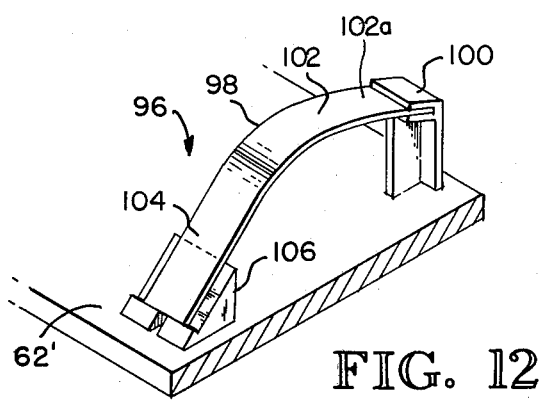
FIG. 12 is a perspective view illustrating a second embodiment of the pushing unit of the present invention.

A modified form of the push unit of the present invention is illustrated in FIG. 12. This unit is generally designated 96 and comprises essentially a resilient metal strip 98 in the form of a leaf spring rigidly mounted at its forward end to the chain 28 by means of a mounting bracket 100. From the mounting bracket 100, the metal strip extends rearwardly and upwardly at a moderate angle to provide a forward cargo engaging portion 102, having a cargo load engaging surface 102a. At the rear of the cargo engaging portion 102, the leaf spring 98 curves downwardly, as at 104, to come into engagement with a seat member 106. The metal strip is initially contoured so that its normal position is to be holding engagement with its seat 106.

When it is desired to move the pushing unit 96 to its released position, an upward and rearward force is applied to the rear portion 104 of the strip 98 to move it out of engagement with its seat 106. The resisting force of the cargo unit being conveyed depresses the metal strip 98 to its non-engaging position, so that it can slip under the cargo load. After passing beneath the cargo load, the metal strip 98 returns to its original contour, where it is in engagement with its holding seat 106.

What is claimed is:

1. A push apparatus adapted to engage a freight load and push it along a conveying path, said apparatus comprising:
  a. a base member adapted to be moved along a conveying path,
  b. a push arm means having a first raised load engaging position and a second lower load release position, said push arm means presenting when in its raised load engaging position an upwardly facing moderately sloping load engaging surface for non-abrupt engagement of a freight load, and movable to its second position in a direction away from a freight load engaged by said load engaging surface,
  c. releasable arm holding means having a hold position to engage said arm means and hold it in its first load engaging position so as to enable said arm means to exert a pushing force against said freight load, said holding means being selectively releasable under load to permit said arm means to move to its second position in response to a resisting force of a freight load against said arm means, and
  d. arm positioning means engaging said arm means to urge said arm means with moderate force to its raised position in the direction toward a freight load engaged by said load engaging surface so as to come into holding engagement with its holding means, whereby with said arm holding means in its hold position, said push arm means is able to engage a load to move the load along a path, and with said arm holding means in its release position, said push arm means can be depressed by a resisting force of the load to its release position to be able to pass beneath the load, after which the arm positioning means is able to return the push arm means to its raised load engaging position with the arm holding means returning to its hold position.

2. The apparatus as recited in claim 1, wherein said arm means is pivotally mounted at its forward end to said base member, and said holding means comprising a movable hold member positioned in its hold position between said arm means and said base member.

3. The apparatus as recited in claim 2, wherein said arm positioning means comprises spring means arranged to push said arm means upwardly to its hold position.

4. The apparatus as recited in claim 3, wherein said holding means is a pivotally mounted holding member, positioned between its related arm means and said base member, and said spring means is arranged to urge said holding member toward its hold position.

5. The apparatus as recited in claim 1, wherein said arm means comprises an arm member cantilevered from said base member and extending upwardly and rearwardly therefrom, said arm holding means comprises a rear catch portion on said arm member and a seat member on said base member to said arm member in its operating position, said arm positioning means comprising a resilient portion of said arm means which is arranged to yield in response to a resisting force of a freight load to be moved thereby to its load release position.

6. A push apparatus adapted to engage a freight load and push it along a conveying path, said apparatus comprising:
  a. a base member adapted to be moved along a conveying path,
  b. an elongated push arm means cantilevered from said base member and extending upwardly and rearwardly therefrom, said push arm means having an upwardly facing moderately sloping load engaging surface for non-abrupt engagement of a freight load, and having a first raised load engaging position and a second lower load release position,
  c. said push arm means having at least a portion thereof made of a resilient material to urge said push arm means with moderate force to its raised position, and
  d. a seat member mounted to said base member and arranged to releasably engage a rear portion of said push arm means and positively hold said push arm means in its raised position, whereby with said push arm means engage with said seat member, said push arm means is held in its raised position to be able to engage and move a load along a path, and with said push arm means released from said seat member, the push arm means can be depressed by a resisting force of the load to its release position to be able to pass beneath the load, after which the resilient portion of the push arm means is able to return the push arm means to its raised load engaging position with the push arm means again engaging the seat member.

* * * * *

UNITED STATES PATENT OFFICE
CERTIFICATE OF CORRECTION

Patent No. 3,993,000  Dated November 23, 1976

Inventor(s) Clyde L. Sherwood

It is certified that error appears in the above-identified patent and that said Letters Patent are hereby corrected as shown below:

Column 5, line 17, after "raised" insert --pallet--.

Column 6, beginning on line 15 and following on line 16, "there is some tendency for the palletized load 38 to 'ride up' onto the inclined push surface..." appears in bold type and should be printed in regular type.

Column 8, line 5, "comprising" should be --comprises--.

Column 8, line 22, after "to" insert --hold--.

Column 8, line 33, "elongated" should be --elongate--.

Column 8, line 48, "engage" should be --engaged--.

Signed and Sealed this

First Day of March 1977

[SEAL]

Attest:

RUTH C. MASON  
*Attesting Officer*

C. MARSHALL DANN  
*Commissioner of Patents and Trademarks*